United States Patent
Brooks et al.

(10) Patent No.: US 11,406,096 B2
(45) Date of Patent: Aug. 9, 2022

(54) SPRAYER BOOM CHARGING SYSTEM

(71) Applicant: CNH Industrial America LLC, New Holland, PA (US)

(72) Inventors: Nathan Paul Brooks, Manitowoc, WI (US); Steven N. Winkel, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 298 days.

(21) Appl. No.: 16/440,273

(22) Filed: Jun. 13, 2019

(65) Prior Publication Data

US 2020/0390079 A1    Dec. 17, 2020

(51) Int. Cl.
| A01M 7/00 | (2006.01) |
| B05B 1/20 | (2006.01) |
| A01C 23/04 | (2006.01) |
| B05B 12/00 | (2018.01) |

(52) U.S. Cl.
CPC ........... *A01M 7/005* (2013.01); *A01C 23/047* (2013.01); *B05B 1/20* (2013.01); *B05B 12/006* (2013.01)

(58) Field of Classification Search
CPC .. A01M 7/0042; A01M 7/005; A01M 7/0089; A01C 23/047; B05B 1/20; B05B 15/55; B05B 15/531; B05B 15/534
USPC ................................................. 239/124–127
See application file for complete search history.

(56) References Cited

U.S. PATENT DOCUMENTS

| 2,140,903 | A | * | 12/1938 | Fisk ...................... | B05B 1/3478 |
| | | | | | 239/119 |
| 3,001,720 | A | * | 9/1961 | Cartwright ............ | E01C 19/174 |
| | | | | | 239/168 |
| 3,023,968 | A | * | 3/1962 | Mitchell ............... | B05B 7/2489 |
| | | | | | 556/42 |
| 4,530,465 | A | * | 7/1985 | Gauchet ................ | B05B 12/085 |
| | | | | | 239/159 |
| 4,723,709 | A | * | 2/1988 | Curran, Jr. ............. | B05B 15/55 |
| | | | | | 239/110 |
| 4,813,604 | A | * | 3/1989 | Curran, Jr. ............ | A01M 7/0042 |
| | | | | | 239/163 |
| 6,285,938 | B1 | * | 9/2001 | Lang ..................... | A01M 7/0089 |
| | | | | | 239/10 |
| 6,536,683 | B1 | * | 3/2003 | Filicicchia ................ | B05B 9/03 |
| | | | | | 239/125 |
| 7,303,145 | B2 | * | 12/2007 | Wysong ................. | A01C 7/004 |
| | | | | | 239/650 |

(Continued)

OTHER PUBLICATIONS

Mark Oliver; Two tractor-drawn sprayers rated; one page; 8.

(Continued)

*Primary Examiner* — Joseph A Greenlund

(74) *Attorney, Agent, or Firm* — Rebecca L. Henkel; Rickard K. DeMille

(57) ABSTRACT

A sprayer boom charging system for an agricultural sprayer is provided that allows a wet boom to be pre-loaded or charged during a charging session with liquid product before starting a spraying session. The boom charging system may deliver liquid product into the boom sections at their downstream ends to flow in a charge-flow or reverse flow direction that is opposite a normal spray delivery flow direction. This purges air from the boom sections and pushes it into the product tank that also collects the purging liquid product so that no liquid product is released onto the ground during the charging session.

13 Claims, 9 Drawing Sheets

(56) References Cited

U.S. PATENT DOCUMENTS

| | | | | |
|---|---|---|---|---|
| 7,478,765 B2* | 1/2009 | Knight | | A01M 7/0089 239/125 |
| 8,075,282 B2* | 12/2011 | Huegerich | | A01M 7/005 417/199.2 |
| 8,109,448 B2* | 2/2012 | Giles | | A01M 7/0092 239/428 |
| 8,800,887 B2* | 8/2014 | Moeller | | A01M 7/0089 239/69 |
| 9,463,484 B2* | 10/2016 | Foster | | B05B 15/5223 |
| 9,554,506 B2* | 1/2017 | Bittner | | A01M 7/0089 |
| 10,631,531 B2* | 4/2020 | Engelbrecht | | A01M 7/0089 |
| 10,786,826 B2* | 9/2020 | Sullivan | | A01M 7/0089 |
| 2006/0192024 A1* | 8/2006 | Wysong | | A01C 7/004 239/8 |
| 2008/0089777 A1 | 4/2008 | Lang | | |
| 2008/0197207 A1* | 8/2008 | Engelbrecht | | A01M 7/0089 239/1 |
| 2014/0182271 A1* | 7/2014 | Jannot | | F01N 3/2066 60/299 |
| 2014/0361094 A1* | 12/2014 | Michael | | A01C 23/042 239/727 |
| 2016/0120118 A1 | 5/2016 | Bouten et al. | | |
| 2016/0175869 A1* | 6/2016 | Sullivan | | B05B 1/20 239/11 |
| 2016/0309647 A1* | 10/2016 | Bittner | | A01G 25/09 |
| 2017/0072420 A1* | 3/2017 | Meyer | | A01M 7/005 |
| 2017/0144180 A1* | 5/2017 | Trask | | B05B 13/005 |
| 2018/0042215 A1* | 2/2018 | Proharam | | A01C 23/042 |
| 2018/0220638 A1* | 8/2018 | Gresch | | A01M 7/0057 |
| 2018/0369851 A1* | 12/2018 | Engelbrecht | | B05B 15/55 |
| 2019/0009285 A1* | 1/2019 | Zimmerman | | B05B 1/20 |
| 2019/0022687 A1* | 1/2019 | Brooks | | A01M 7/0089 |
| 2019/0373880 A1* | 12/2019 | Kocer | | B05B 15/658 |
| 2020/0390079 A1* | 12/2020 | Brooks | | B05B 12/04 |

OTHER PUBLICATIONS

Peter Hill; Self-primer offers spraying savings; ProQuest LLC; 3 pages; May 10, 2008.

Malte Dorpmund; Pesticide reclamation and cleaning of direct nozzle injection systems; 3 pages; ProQuest LLC; copyright 2018.

Ken Wilson; New RoGator ups ante on spray features; 2 pages; May 12, 2016; ProQuest LLC; copyright 2018.

Ag Talk chatroom; 4 pages; Mar. 3, 2014.

* cited by examiner

SPRAYER BOOM CHARGING SYSTEM

FIELD OF THE INVENTION

The invention relates generally to agricultural product application equipment such as self-propelled sprayers and, in particular, to a sprayer boom charging system for an agricultural sprayer.

BACKGROUND OF THE INVENTION

Sprayer boom lengths of self-propelled sprayers are increasing over time to allow increased coverage in a single spraying pass. Compared to earlier shorter booms, longer sprayer wet booms require longer lengths of liquid product-carrying lines that include tubes, pipes, hoses, and other plumbing components. Longer lines have greater internal volumes and therefore contain more air before they are loaded with liquid product. Air in the lines gets trapped at the ends of the boom, or its boom segments as liquid product is delivered downstream to load the boom with product, before spraying. The trapped air can get compressed by the liquid product and the compressed air can act like an accumulator that pressurizes or holds pressure in the line(s) even without pressure from a system delivery pump, which can lead to application anomalies. Furthermore, nozzles that align with compressed air pockets may deliver product inconsistently, at least until air is evacuated through the nozzles. Systems have been developed to reduce these issues and improve application accuracy by purging air out of the boom. Some systems purge air with a product-spray air purging technique that opens boom nozzles while delivering liquid product to the boom to drive the air out of the boom until liquid product is delivered from the nozzles. However, this can be wasteful, since product is leaked or sprayed onto the ground without being applied in a spraying session. Other systems continuously circulate product through the boom and back to the product tank. However, in these types of recirculating or continuous circulation systems, activating boom sections typically leads to application delay and pressure drop(s) within the system, which can at least momentarily compromise delivery accuracy.

SUMMARY OF THE INVENTION

A sprayer boom charging system for an agricultural sprayer is provided that allows a wet boom to be pre-loaded or charged with liquid product before starting a spraying session. The boom charging system pumps liquid product into the boom sections, which may be done in a reverse flow direction compared to the spray delivery flow direction to purge air from the boom sections into the product tank. The sprayer boom charging system reduces waste by eliminating product-spray air purging and reduces pressure drops during initial application associated with continuous circulation systems.

According to one aspect of the invention, the boom charging system may provide a dual flow path through each of the delivery plumbing segments at the boom sections. A normal flow direction delivers product out of the boom sections during a spraying session and a reverse flow direction purges air out of the boom sections and may direct the purged air into the product tank. This prevents product waste while loading or charging the boom by allowing a volume of liquid product that purges the air to return to the product tank for use during the spraying session.

According to another aspect of the invention, the boom charging system provides automatic boom charging by controlling electronically actuated valves to establish a sequence of liquid product flow direction changes through the boom sections. The automatic boom charging may be implemented as a single charge activation command, such as a single button-press boom air purge that charges the boom with liquid product during a charging session before a spraying session.

According to another aspect of the invention, an agricultural sprayer that implements the boom charging system includes a spray system with a product tank that stores liquid product and a wet boom with multiple boom sections. The sprayer boom charging system includes a charge delivery tube or line that is configured to deliver the liquid product to the multiple boom sections during a boom charging session. A charge return tube or line is configured to direct air away from the multiple boom sections during the boom charging session.

According to another aspect of the invention, each of the multiple boom sections has an upstream end receiving the liquid product from the product tank during a spraying session and an opposite downstream end. Multiple nozzles arranged between the upstream and downstream ends deliver the liquid product from the respective boom section toward an agricultural field, A first product flow direction may be defined during the spraying session by a flow of the liquid product from the upstream end to the downstream end of each boom section. A second, opposite product flow direction may be defined during the boom charging session. The second product flow direction corresponds to a flow of the liquid product from the downstream end to the upstream end of each boom section.

According to another aspect of the invention, the charge return line may be connected to the product tank. This allows air that is purged from the boom sections to be directed into the product tank during the boom charging session.

According to another aspect of the invention, the charge delivery line defines a main charge delivery line. The system may further include a section charge delivery line or charge branch line at each of the boom sections that connects the respective boom section to the main charge delivery line. Each charge branch line may connect charge delivery line to the downstream end of the respective boom section.

According to another aspect of the invention, a pump delivers the liquid product from the product tank to the spray product delivery line and an intersection of the spray product delivery line, and the charge return line defines a spray delivery/charge return intersection. One or more valves are arranged in the spray product delivery line between the spray delivery/charge return intersection and the pump. The valve(s) directs flow through the spray delivery/charge return intersection into and through the charge return line to direct purged air from the boom sections to the product tank. The valve(s) can be, for example, a one-way check valve that automatically directs flow of air or product in an upstream direction through the charge return line instead of through the rest of the spray product delivery line. The valve(s) can also be an electronically actuated valve, or both a one-way cheek valve and an electronically actuated valve may be implemented, for example, on opposite sides of a flow meter in the spray product delivery line.

According to another aspect of the invention, the sprayer boom charging system includes a control system that controls the valve system to establish different flow paths through the wet boom and/or various components of the onboard liquid product delivery system. The wet boom, or at least one of its segments, defines a spray-flow direction and an opposite charge-flow direction. The spray-flow and charge-flow directions correspond. to directions of product flow through the boom during spraying and charging sessions, respectively. The control system sends commands that actuate valves within the valve system to (i) provide a charging flow path that delivers the liquid product through the boom in the charge-flow direction during the charging session, and (ii) provide a spraying flow path that delivers the liquid product through the boom in the spray-flow direction during the spraying session.

According to another aspect of the invention, a flow meter monitors product flow rate during the spraying session, and a flow meter bypass line directs liquid product around the flow meter instead of through the flow meter during the charging session. The flow meter bypass line may connect to the product tank so that the liquid product which purges the air from the boom returns to the product tank.

According to another aspect of the invention, an end valve assembly may be mounted to an end of each boom segment, such as at the boom segment's downstream end. The end valve assembly may selectively introduce the liquid product into the boom segment during the charging session. The end valve assembly may include a drain valve and a charge valve. The drain valve may allow liquid product to be drained out of the boom, for example, during a draining or blow-out procedure. The charge valve may allow liquid product to be introduced into the boom to purge air out of the boom and, for example, deliver the air into the product tank during the charging session.

According to another aspect of the invention, a method of pre-loading or charging a spray boom includes selectively directing liquid product through different flow paths to purge air from the boom, which may include forcing the air into the product tank. Liquid product may be delivered in a charge-flow direction through the boom or its segment(s), which may be the opposite of the normal flow direction or a spray-flow direction of liquid product while spraying. Delivering the liquid product in the opposite or charge-flow direction forces the air out of the boom in an upstream or reverse direction, compared to the normal spray-flow direction, and may deliver the air into the product tank. This allows subsequent delivery of the liquid product that drove the air out of the boom to be collected in the product tank.

According to another aspect of the invention, the valves are selectively actuated to provide a sequential deliver of liquid product to boom segments. An on-board logic controller of a control system may coordinate the sequential valve actuation to back feed the boom and allow, for example, a one-push automated boom charging session.

According to another aspect of the invention, the pluming of the charging system allows for un-loading a recovering liquid product after a spraying session. A boom blow-out system can cooperate with the charging system's plumbing to deliver air into various parts of the charging system and pneumatically drive the liquid product from various lines or boom segments back to the product tank, reducing pipe waste.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
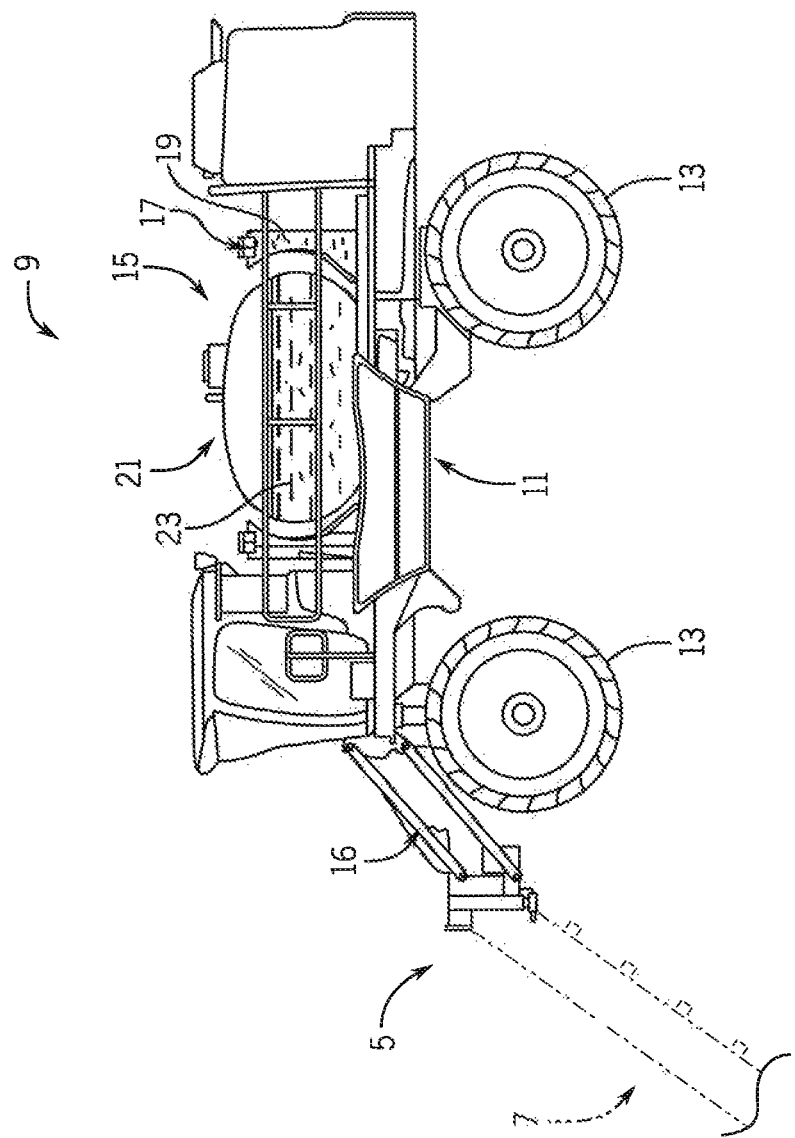
FIG. 1 is a side elevation of a self-propelled sprayer implementing a sprayer boom charging system according to the present invention.

Referring now to the drawings and specifically to FIG. 1, a sprayer boom charging system, shown as system 5, is configured to pre-load or charge a wet boom 7 with liquid product during a boom charging session of an agricultural sprayer, for example, before a spraying session. The sprayer is shown here as a self-propelled agricultural sprayer vehicle or self-propelled sprayer 9. System 5 may be incorporated within an overall plumbing or fluid-conveying system that is configured to deliver fluids such as liquid product and/or air at various times to the boom 7 or other components. Although sprayer 9 is shown as a front-mounted boom self-propelled sprayer, it is understood that self-propelled versions of sprayer 9 can have other boom-mounting arrangements, including rear-mounted booms, such as those available from CNH Industrial, including the Miller Nitro and Condor Series sprayers and New Holland Guardian Series sprayers.

Still referring to FIG. 1, sprayer 9 includes chassis 11 having a chassis frame that supports various assemblies, systems, and components. These various assemblies, systems, and components include a cab, engine, and hydraulic system. The hydraulic system receives power from the engine to provide hydraulic pressure for operating hydraulic components within the sprayer 9 including, e.g., propel and steering systems for rotating and steering the wheels 13 of the sprayer 9 and also for boom adjustment, such as controlling hydraulic cylinders that move lift arms 16 up and down for adjusting the height of boom 7 and correspondingly adjusting the product's application height. Spray system 15 is also part of the overall fluid-conveying system and includes storage containers such as a rinse tank 17 that stores water or another rinsing liquid or solution 19, and a product tank 21 that stores a volume of liquid product 23 for delivery onto an agricultural field. The product includes any of a variety of agricultural liquid products, such as various pesticides, herbicides, fungicides, liquid fertilizers, and other liquids, including liquid suspensions beneficial for application onto agricultural fields.

Figure 2:
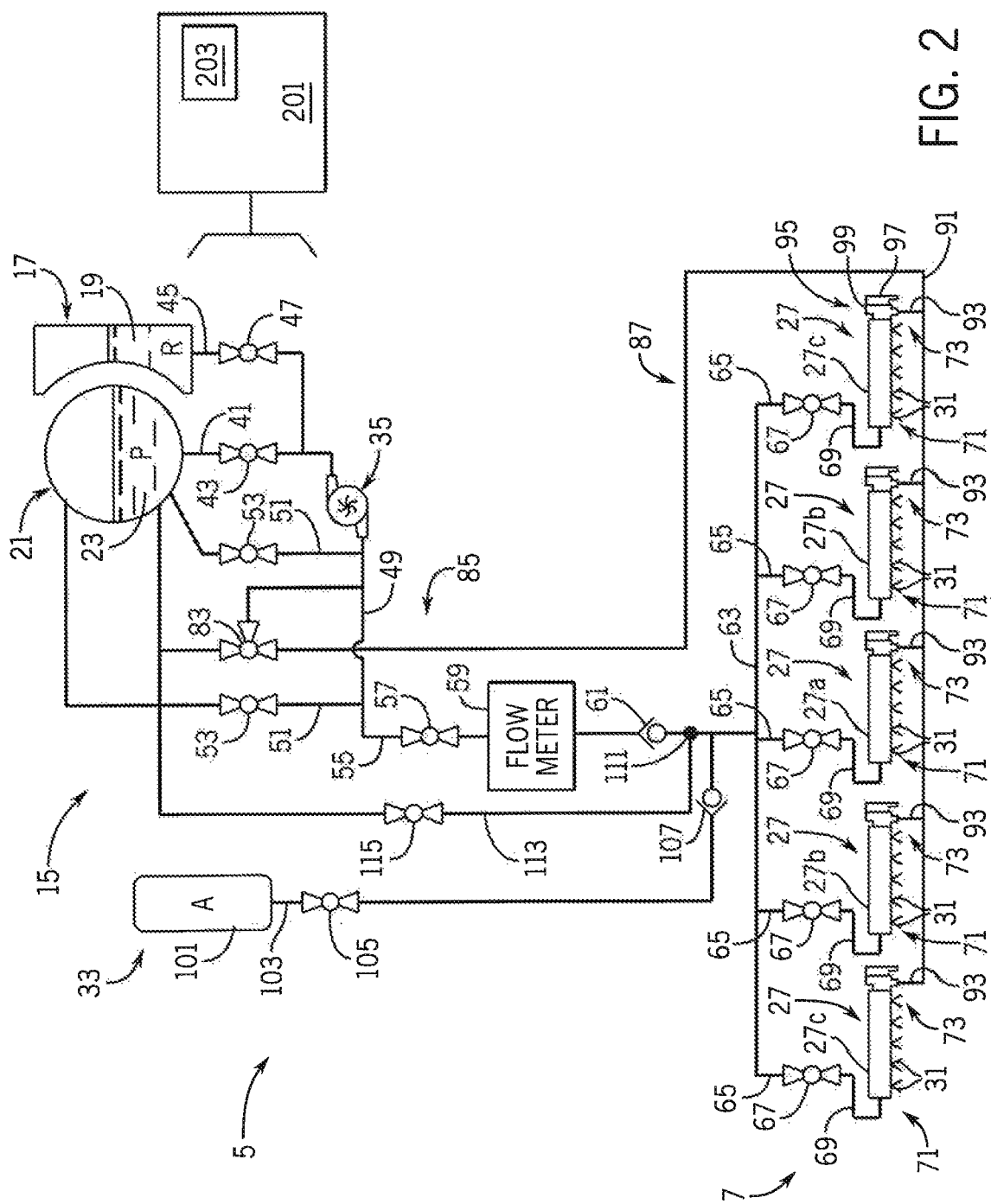
FIG. 2 is a simplified schematic representation of the sprayer boom charging system of FIG. 1.

Referring now to FIG. 2, boom 7 is represented as a segmented boom with multiple boom sections, shown here with five boom sections 27. Boom sections 27 include center section 27a that is supported by lift arms 16 (FIG. 1). Left and right boom arms extend from the center section 27a at left and right sides of the sprayer 9 (FIG. 1). Each of the left and right boom arms includes a primary or main boom section 27b attached at its inner end to the outer end of center section 27a. The secondary or outer boom sections 27c, which may include breakaway boom sections, is arranged outwardly of the main boom sections 27b, with inner ends of outer boom sections 27c connected to the outer ends of the main boom sections 27b. Each boom section 27 has multiple spray nozzles 31 that are configured to release the liquid product out of the respective boom section 27 for application onto the agricultural field, with the group of spray nozzles 31 at each boom section 27 defining a discrete spray section of boom 7.

Still referring to FIG. 2, the spray sections or boom sections 27 selectively receive the liquid product and/or air from other components or systems within the overall fluid-conveying system, such as the spray system 15, to deliver liquid product 23 or blow-out system 33 to deliver pressurized air to evacuate product out of the boom sections 27. Each of the sprayer boom charging system 5, spray system 1, and blow-out system 33 includes plumbing-type components that may collectively define various circuits or flow-paths that are selectively defined through the sprayer 9 (FIG. 1) to achieve corresponding functions of sprayer boom charging system 5, spray system 15, and blow-out system 33. Plumbing-type components include those of lines systems which may include interconnected lines such as tubes, pipes, hoses, and those of valve systems with actuatable valves, including electronically controllable valves such as electronically actuated ball valves. Some of the components may be shared between various ones of the sprayer boom charging system 5, spray system 15, blow-out system 33, or other systems of the sprayer 9 (FIG. 1).

Still referring to FIG. 2, pump 35 is configured to deliver liquid product 23 or rinse solution 19 to boom 7 or other locations within the overall fluid-delivery system. Product tank outlet line 41 delivers the liquid product 23 to pump 35 from product tank 21. Product tank outlet valve 43 is mounted in product tank outlet line 41 and can be actuated to selectively allow or prevent flow of liquid product 23 to pump 35. Rinse tank outlet line 45 delivers the rinse solution 19 to pump 35 from rinse tank 17. Rinse tank outlet valve 47 is mounted in rinse tank outlet line 45 and can be actuated to selectively allow or prevent flow of rinse solution 19 to pump 35. Pump outlet line 49 delivers liquid product 23 or rinse solution 19 in a downstream direction from the pump 35, From the pump outlet line 49, two recirculating lines 51 are shown connecting the pump outlet line 49 to the product tank 21. Recirculating valves 53 are mounted in recirculating lines 51 and can be actuated to selectively allow or prevent flow back to the product tank 21 from pump outlet line 49. A main spray product delivery line 55 extends from the pump outlet line 49 toward boom 7. A boom delivery valve 57, a flow meter 59, and a check valve 61 are shown mounted in the spray product delivery line 55. Boom delivery valve 57 is mounted in the spray product delivery line 55 and can be actuated to allow or prevent flow through the spray product delivery line 55 toward flow meter 59. Flow meter 59 is configured to monitor product flow rate during the spraying session. A product check valve shown as check valve 61 has one-way operation and automatically opens to allow flow in a downstream direction from flow meter 59 and closes to prevent upstream flow to flow meter 59.

Still referring to FIG. 2, downstream of check valve 61, product delivery line 55 is connected to boom main line 63, shown here as extending along the length of boom 7. A boom branch line 65 extends from boom mainline 63 to each of the boom sections 27. Section feed valves 67 are mounted in the boom branch lines 65 and can be actuated to selectively allow or prevent flow to the boom sections 27 from the boom branch lines 65. Downstream of each section feed valve 67, boom section line 69 extends across the length of the respective boom section 27. Spray nozzles 31 of each spray section connect to the boom section line 69 of the corresponding boom section 27. Each boom section 27 defines an upstream end 71 and a downstream end 73. During a spray session, liquid product 23 flows in the first flow direction from the upstream end 71 to the downstream end 73 of the boom section 27. This first flow direction from the upstream end 71 to the downstream end 73 is the normal flow direction and defines a spray-flow direction of the liquid product 23.

Still referring to FIG. 2, sprayer boom charging system 5 is configured to deliver liquid product 23 and a second flow direction, that is opposite the first or spray-flow direction. During a charging session, the liquid product 23 flows from the downstream end 73 to the upstream end 71 of the boom section 27. This second flow direction from the downstream end 73 to the upstream end 71 is a reverse flow direction and defines a charge-flow direction of the liquid product 23. Sprayer boom charging system 5 defines a boom-charging circuit with pump branch line 81 that is connected to pump outlet line 49, shown here connected between intersections of the recirculating lines 51 and the pump outlet line 49. Charge selector valve 83 is mounted in pump branch line 81 and is shown here as a 3-way valve that can be actuated to selectively direct liquid product 23 to return to product tank 21 or toward boom 7 for pre-loading or charging the boom 7 through charging line system 85. Charging line system 85 defines a charging circuit with charge delivery line 87 that delivers liquid product 23 to the boom sections 27 during the boom charging session. Charge delivery line 87 defines a main charge delivery line 91 that extends along the length of boom 7. A section charge delivery line or charge branch line 93 extends from main charge delivery line 91 to each of the boom sections 27.

Still referring to FIG, 2, end valve assembly 95 connects each charge branch line 93 to the respective boom section 27. End valve assemblies 95 are shown mounted to the downstream ends 73 of boom sections 27. Each end valve assembly 95 is shown with drain valve 97 and charge valve 99, which may be and electronically controllable such as electronically actuated ball valves. Only one valve assembly 95 and its drain and charge valves 99 are labeled in FIG. 2, toward the bottom right. Drain valve 97 is configured to actuate to an open position drain liquid product out of the respective boom section 27 after the spraying session, for example, by gravity or blown out by compressed air from blow-out system 33. Blow-out system 33 includes an air compressor and air tank 101 to hold a volume of air pressurized by the air compressor. A main air delivery line 103 extends from the air tank 101 toward boom 7. Air delivery valve 105 is mounted in the air delivery line 103 and can be actuated to allow or prevent flow of pressurized air through the air delivery line 103 toward boom 7. An air check valve shown as check valve 107 has one-way operation and automatically Opens to allow flow in a downstream direction from air tank 101 and closes to prevent upstream flow to air tank 101.

Still referring to FIG. 2, charge valve 99 is configured to actuate to an open position to introduce liquid product 23 into the boom. Charge valve 99 may be connected to an end of boom section line 69 at the downstream end 73 of each boom segment. This selectively fluidly couples the charging line system 85 to the boom 7 to allow the liquid product 32 to flow in the charge-flow direction or reverse direction from the downstream end 73 to the upstream end 71 of each boom section 27 and then in the reverse direction through the rest of the boom plumbing such as the boom section line 69, section feed valves 67, boom branch lines 65, and part of the main spray product delivery line 55, toward flow meter 59. During a charging session, check valves 61, 107 prevent the liquid product 23 from flowing further toward flow meter 59 of spray system 15 and air tank 101 of blow-out system 33. A spray delivery/charge return intersection 111 is defined in a location of intersection between the main spray product delivery line 55 and a charge return line 113 of the charging line system 85. Charge return line 113 is directs air that is purged by liquid product 23 and the purging liquid product 23 away from the boom sections 27 during the boom charging session. Charge return line 113 is shown here connected, at its end opposite spray delivery/charge return intersection 111, to product tank 21. This allows both the purged air and the purging or charging liquid product 23 to be collected in the product tank 21, with the air capable of being vented to atmosphere through the product tank's 21 vent system, along a path that extends around flow meter 59 so that the illustrated charge return line defines a flow meter bypass line. Charge return valve 115 is mounted in the charge return line 113 and can be actuated to allow or prevent flow through the charge return line 113 toward boom 7.

Still referring to FIG. 2, control system 201 is configured to control the valve system and other systems to selectively define the fluid flow path(s) through sprayer 9 (FIG. 1) during the spraying session or the charging session. Control system 201 includes a power supply and an on-board logic controller, shown as controller 203, that can include an industrial computer or, e.g., a programmable logic controller (PLC), along with corresponding software and suitable memory for storing such software and hardware including interconnecting conductors for power and signal transmission for detecting states or characteristics within the sprayer boom charging system 5, spray system 15, blow-out system 33, or other systems of the sprayer 9 (FIG. 1), as well as controlling electronic, electro-mechanical, and hydraulic components of these systems and may communicate with or control other components of the sprayer 9. An interface system is operably connected to the controller 203 and includes a monitor and various input devices such as an HMI (human machine interface) to allow an operator to see the statuses and control various operations of the systems from within the cab of the sprayer, including inputting information for controlling system 5, which may include a single charge activation command. The single charge activation command may be implemented as a single button-press boom air purge through the HMI that charges the boom 7 with liquid product 23 during a charging session that occurs before a spraying session. Control system 201 may be configured so that when a user presses a boom pre-load or boom charge button, which may correspond to a displayed button of a GUI (graphical user interface) of touchscreen HMI or manipulation of a mechanical button, the control system 201 commands monitoring and energizing various components according to the stored program to charge the boom 7, which may provide sequential delivery of liquid product 23 to boom sections 27. An on-board logic controller of a control system may coordinate the sequential valve actuation to back feed the boom and allow, for example, a one-push automated boom charging session.

Figure 3:
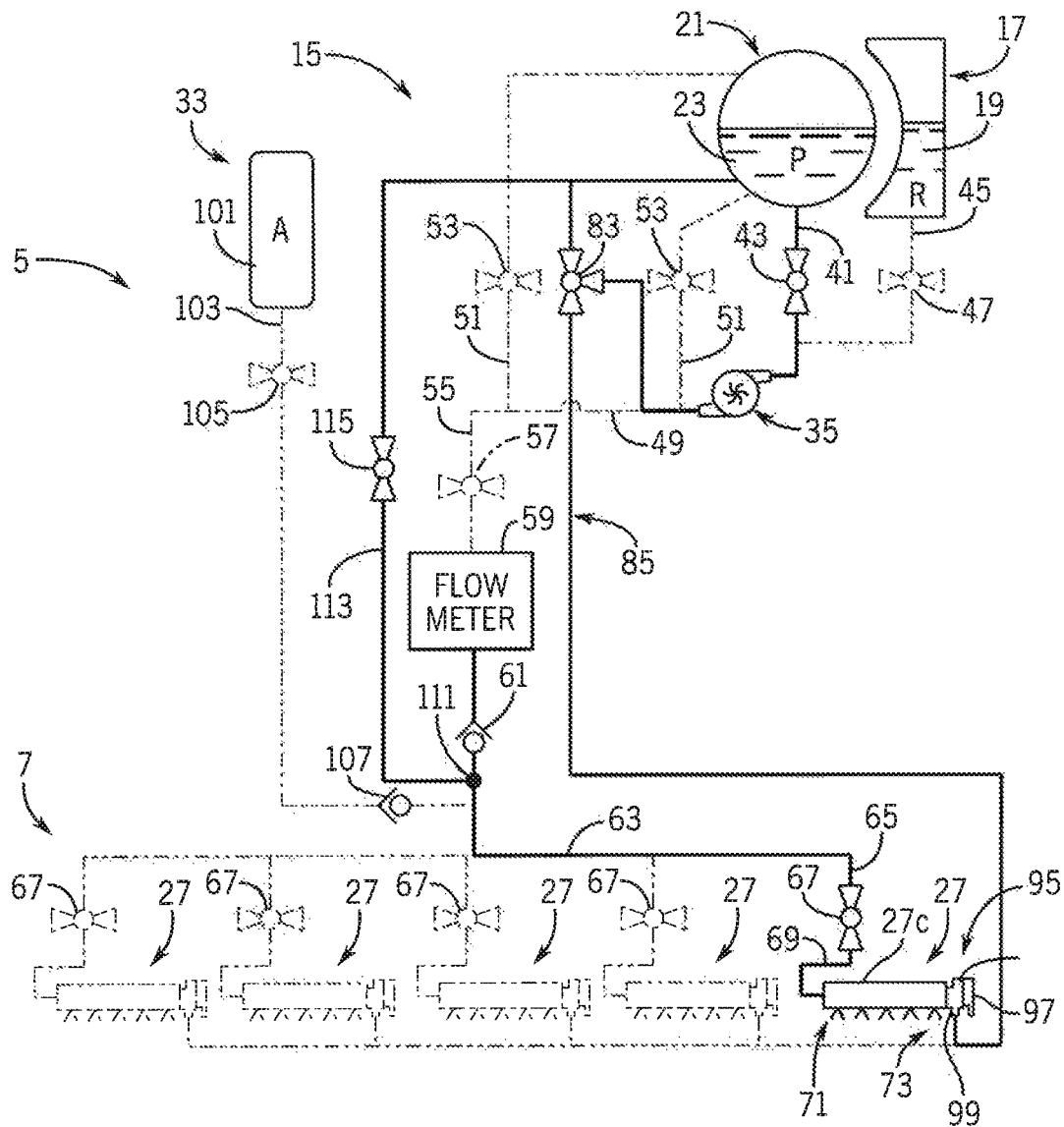
FIG. 3 is a simplified schematic representation of the sprayer boom charging system of FIG. 1 in a phase of an exemplary sequential charging session.
Figure 4:
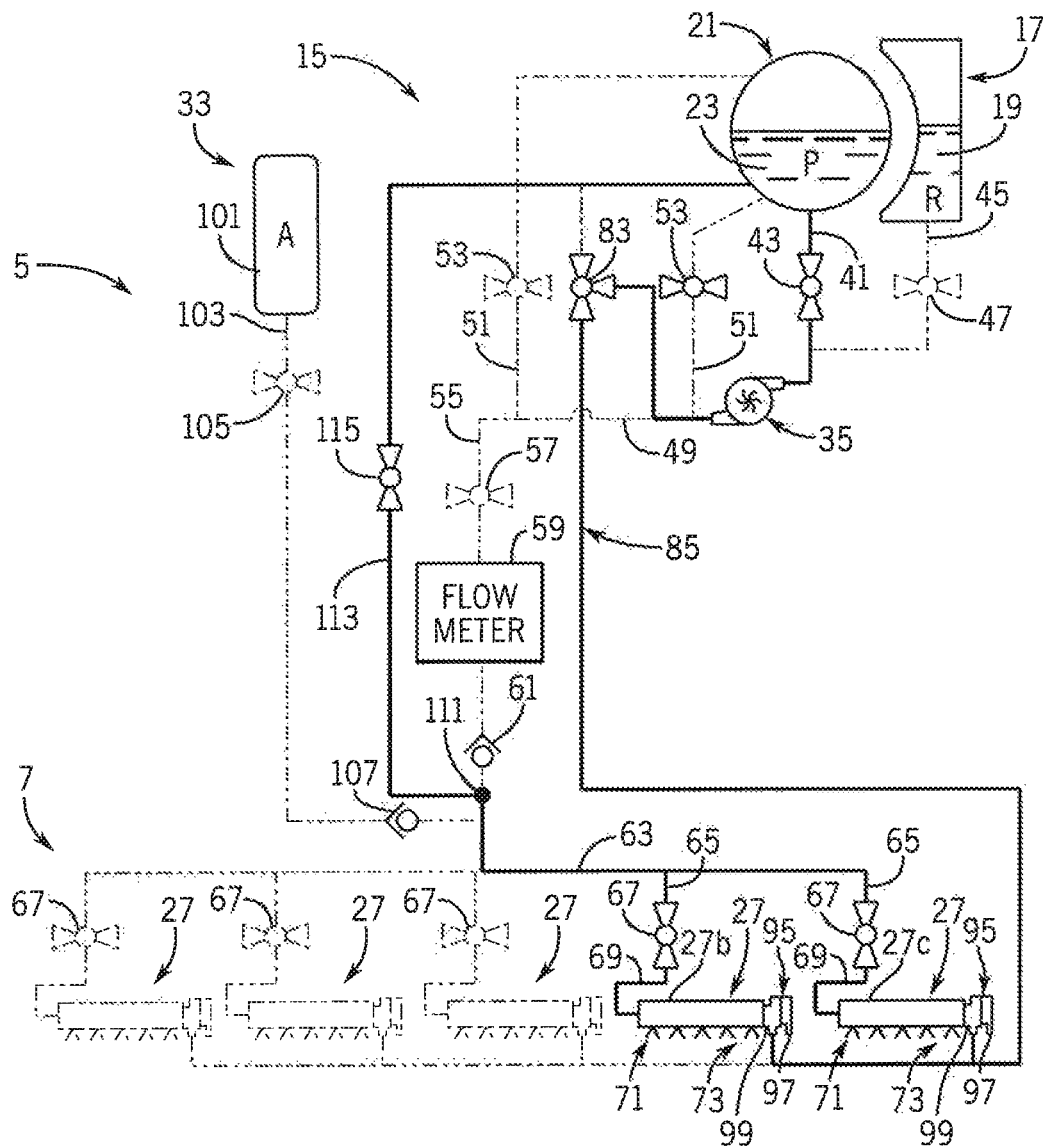
FIG. 4 is a simplified schematic representation of the sprayer boom charging system of FIG. 1 in another phase of an exemplary sequential charging session.
Figure 5:
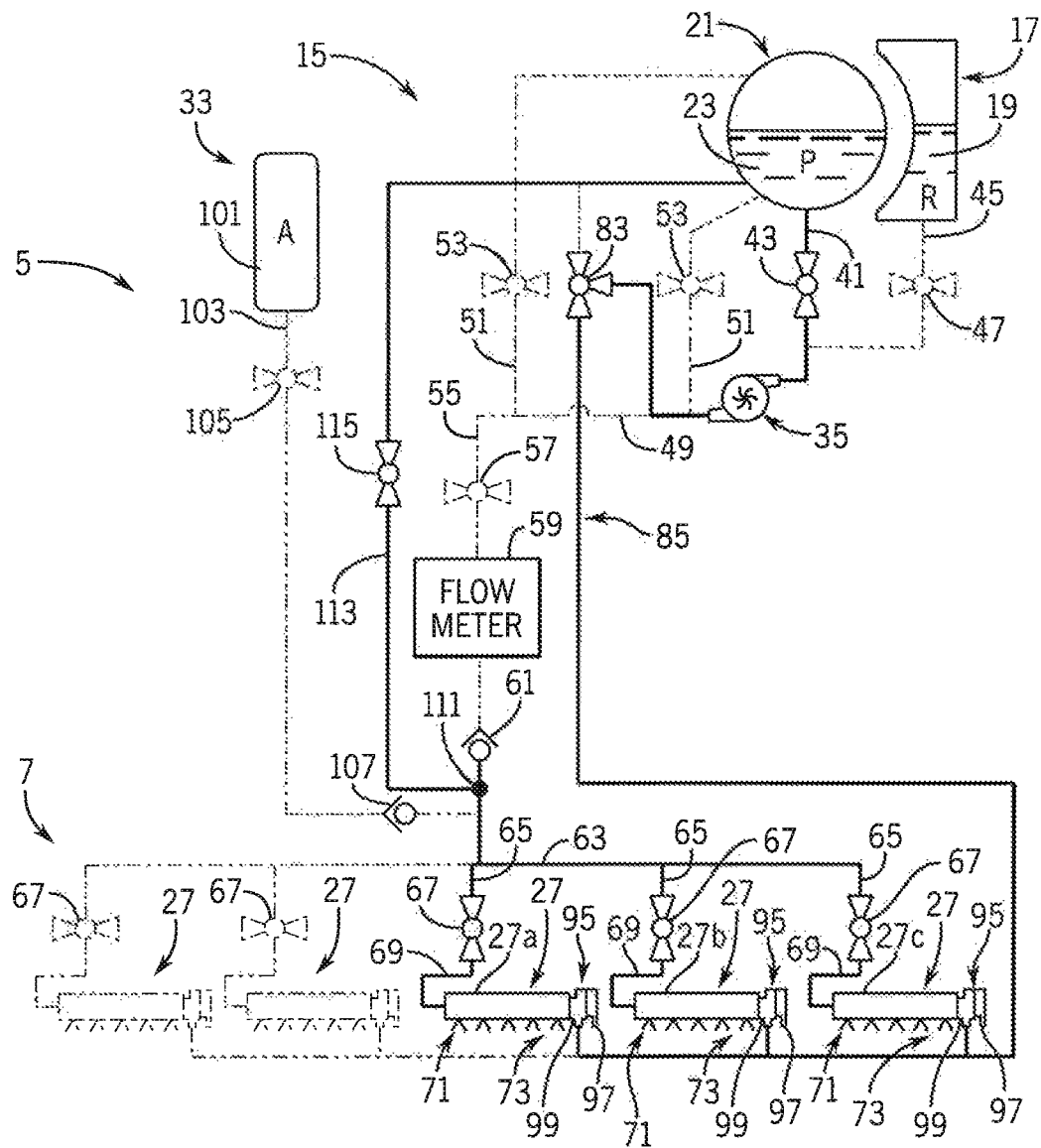
FIG. 5 is a simplified schematic representation of the sprayer boom charging system of FIG. 1 in another phase of an exemplary sequential charging session.
Figure 6:
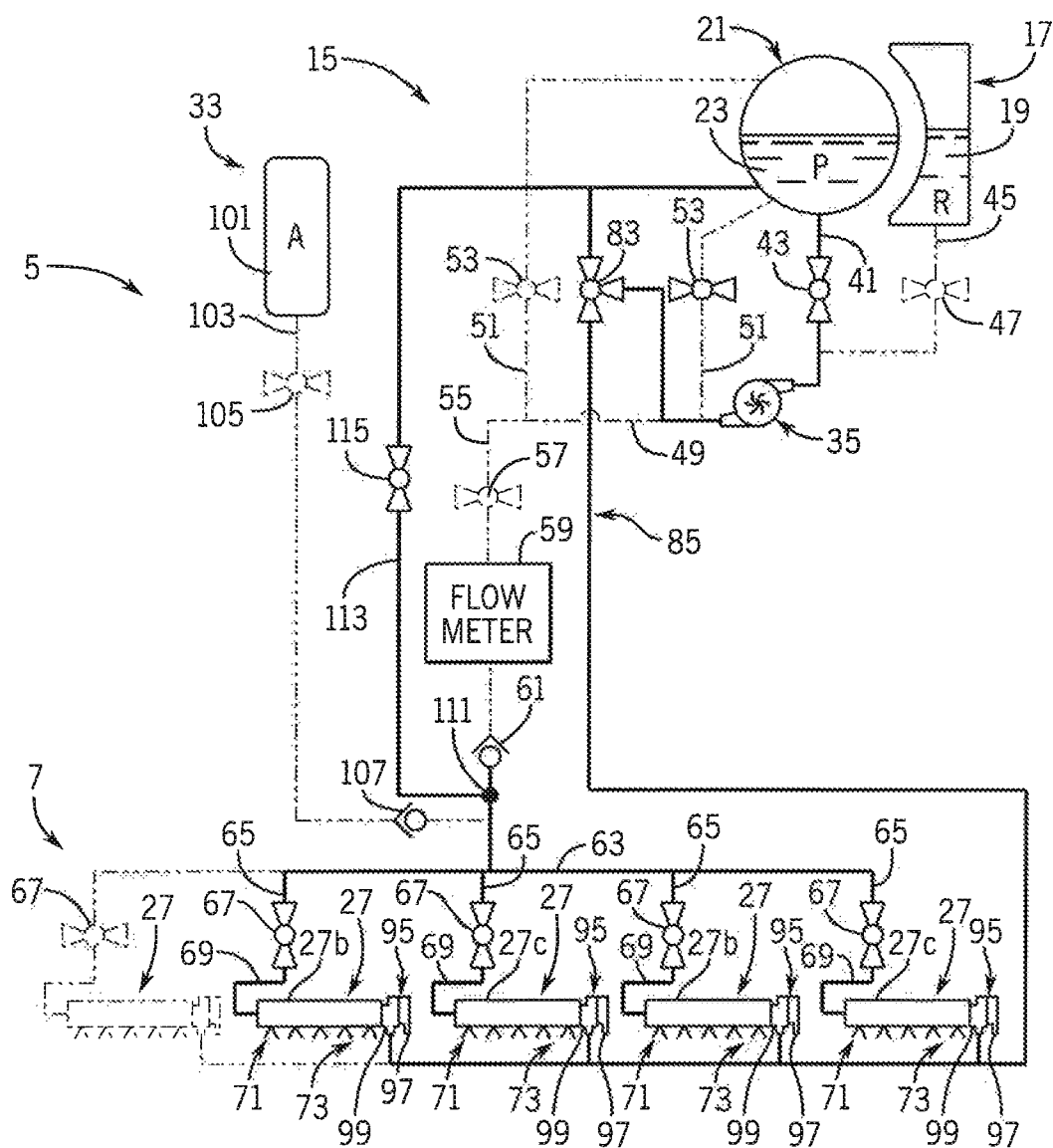
FIG. 6 is a simplified schematic representation of the sprayer boom charging system of FIG. 1 in another phase of an exemplary sequential charging session.
Figure 7:
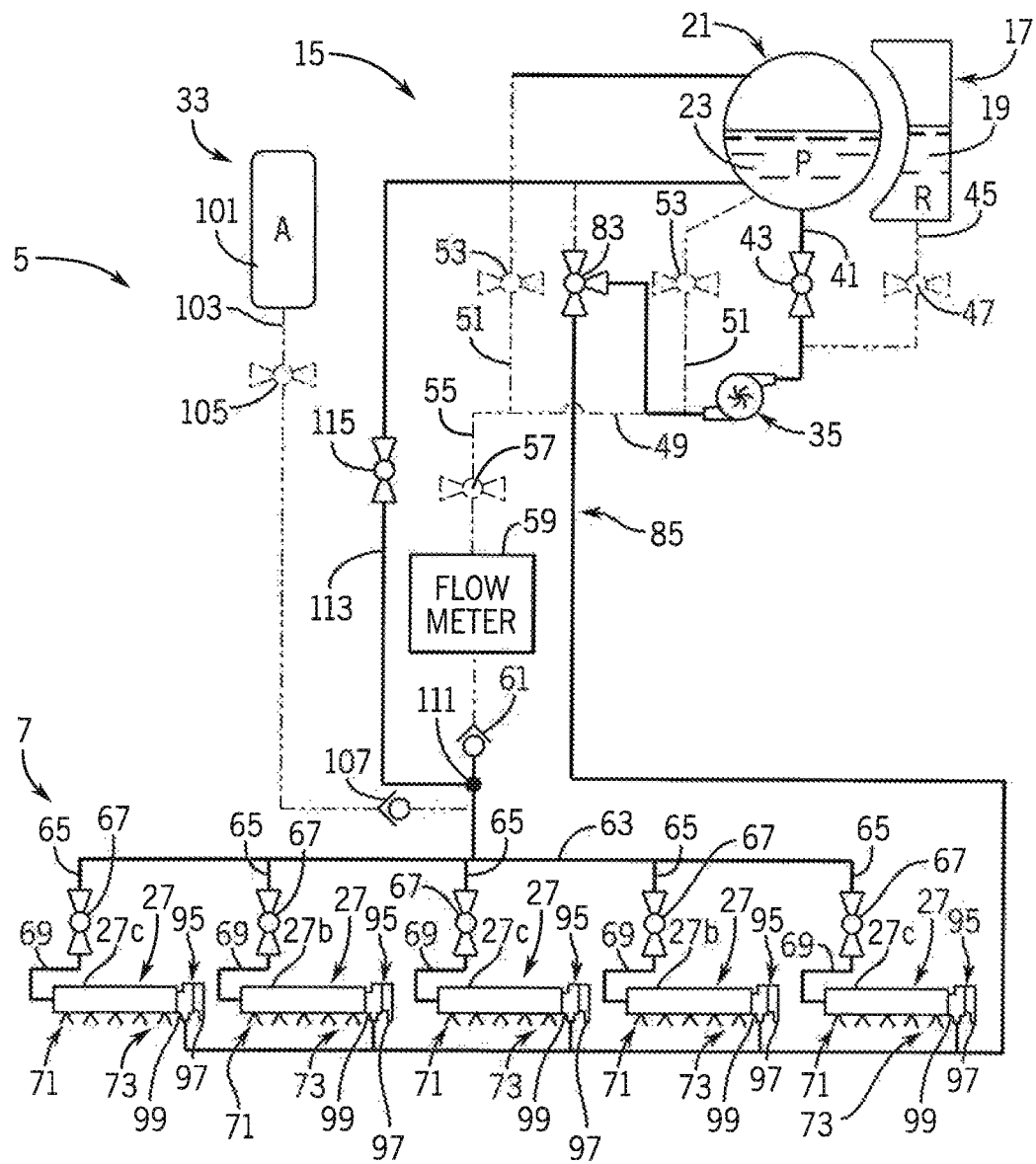
FIG. 7 is a simplified schematic representation of the sprayer boom charging system of FIG. 1 in another phase of an exemplary sequential charging session.

FIGS. 3-7 represent a charging session implemented as a sequential pre-loading or charging of boom 7. As represented in FIG. 3, after a user initiates the charging session through the control system's 201 HMI, the control system 201 establishes a charging flow of liquid product 23 in the reverse or charge-flow direction through boom 7 by actuating various valves of the valve system and energizing pump 35. A first phase of the exemplary sequential pre-loading or charging of boom sections 27 is shown in FIG. 3. In this first phase, control system 201 checks statuses and/or sends actuating commands to actuate various valves of the valve system(s) and deliver liquid product 23 in the charging direction through a first boom section 27. The first boom section 27 that is being charged is shown here as the outer boom section 27c toward the bottom right in solid line form. The other boom sections 27 that are not being charged in this first phase are shown in dashed line form. To achieve the first phase flow path shown in FIG. 3, control system 201 actuates to closed positions or confirms closed positions of rinse tank outlet valve 47, recirculating valves 53, boom delivery valve 57, section feed valves 67, drain valves 97, and charge valves 99 of the four boom sections 27 that are not being charged. Control system 201 actuates to open positions or confirm open positions of charge selector valve 83, charge return valve 115, and section feed valve 67 and charge valve 99 of the boom section 27 that is being charged. Control system 201 energizes pump 35 to purge air out of the boom section 27 and into the product tank 21 while collecting any of the purging liquid product 23 that is pumped that far. FIG. 4 shows a second phase of the sequential charging session. In the second phase, control system 201 maintains the same valve positions and system operation as the first phase while also opening the section feed valve 67 and charge valve 99 to direct liquid product 23 through a second boom section 27, shown in solid line form to the left of and adjacent the first boom section that was charged. FIG. 5 shows a third phase of the sequential charging session. In the third phase, control system 201 maintains the same valve positions and system operation as the first two phases, while also opening the section feed valve 67 and charge valve 99 to direct liquid product 23 through a third boom section 27, shown in solid line form to the left of and adjacent the first two boom sections that were charged. FIG. 6 shows a fourth phase of the sequential charging session. In the fourth phase, control system 201 maintains the same valve positions and system operation as the first three phases, while also opening the section feed valve 67 and charge valve 99 to direct liquid product 23 through a fourth boom section 27, shown in solid line form to the left of and adjacent the first three boom sections that were charged. FIG. 7 shows a fifth phase of the sequential charging session. In the fifth phase, control system 201 maintains the same valve positions and system operation as the first four phases, while also opening the section feed valve 67 and charge valve 99 to direct liquid product 23 through a fifth boom section 27, shown in solid line form as the farthest-left boom section.

Figure 8:
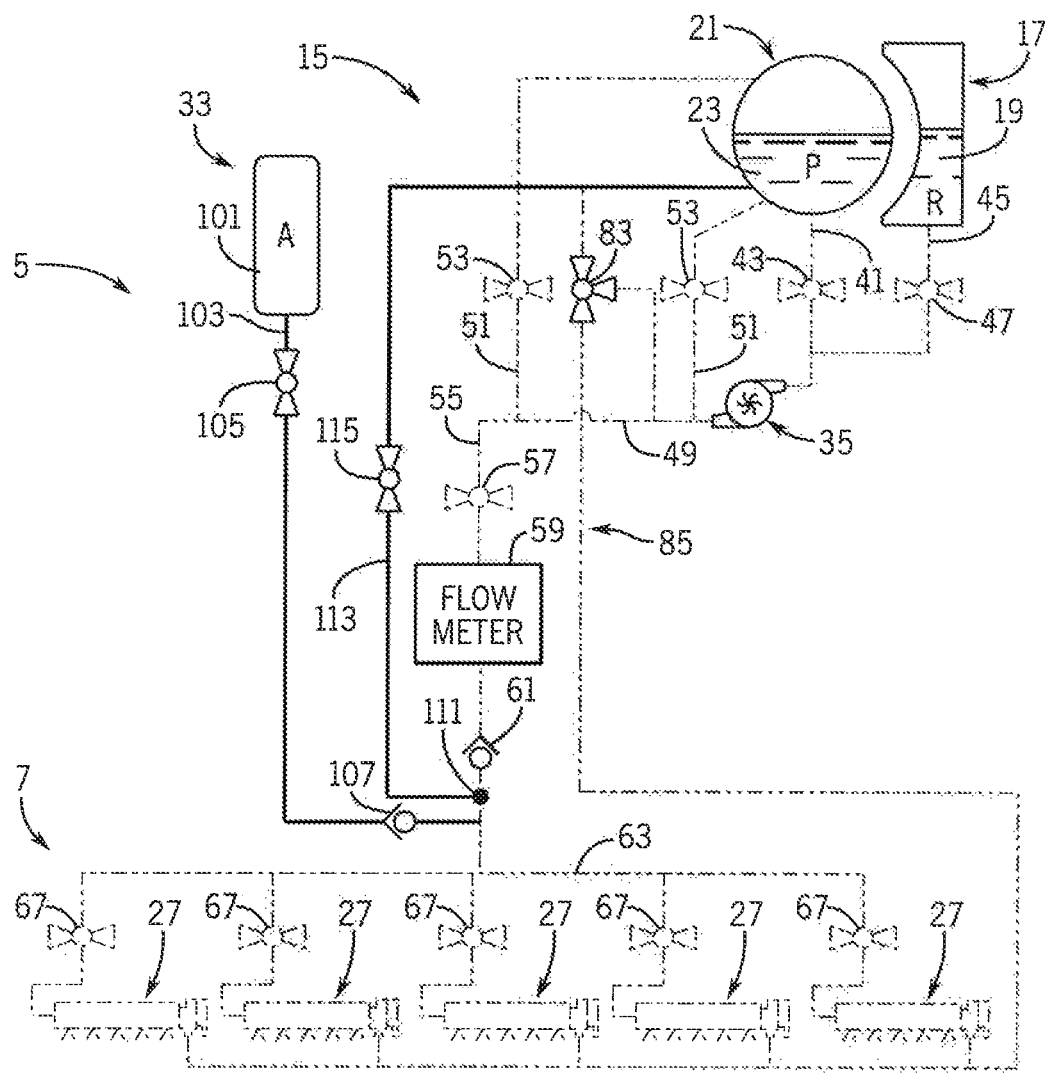
FIG. 8 is a simplified schematic representation of the sprayer boom charging system of FIG. 1 in an unloading session.
Figure 9:
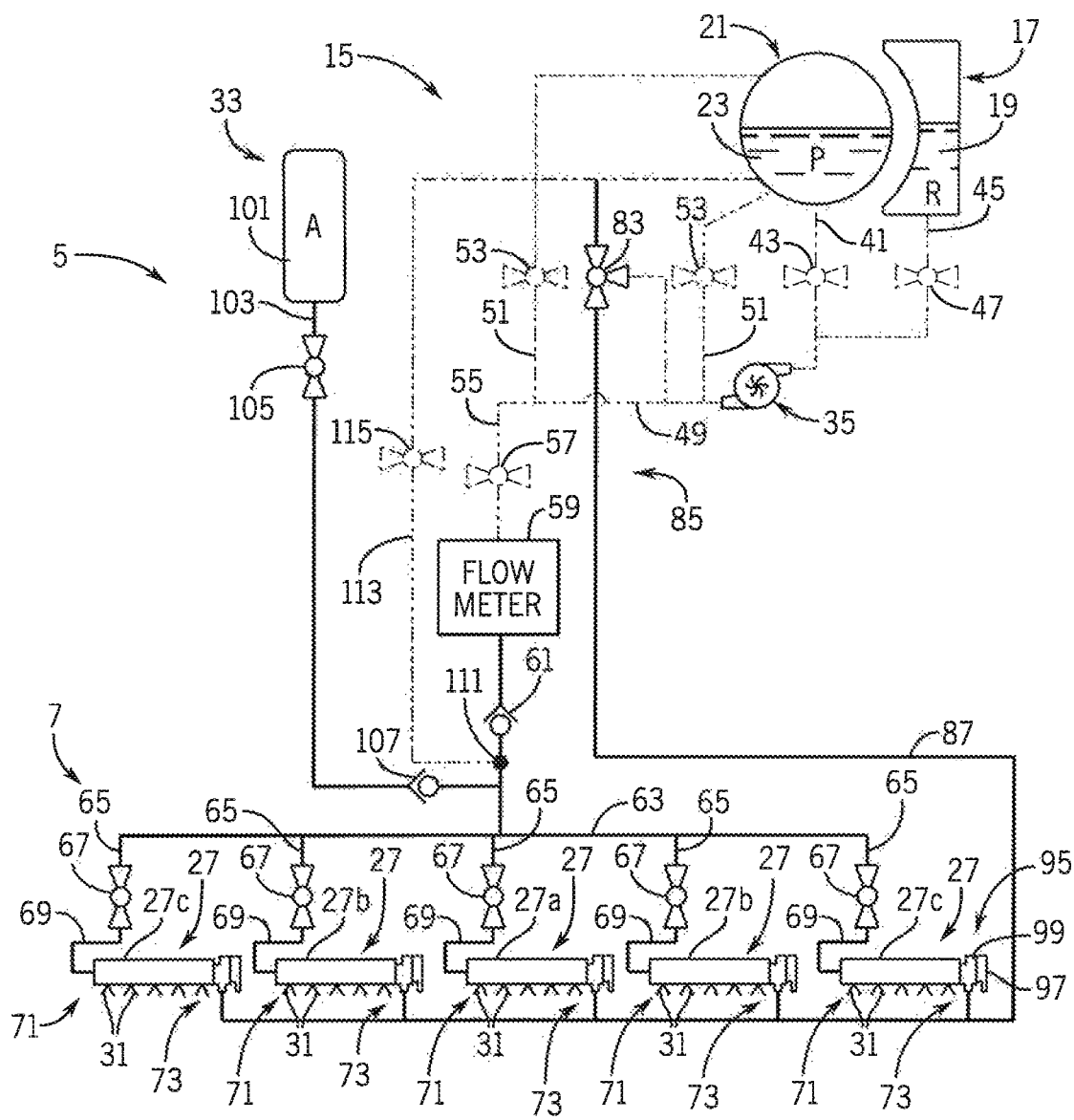
FIG. 9 is a simplified schematic representation of the sprayer boom charging system of FIG. 1 in a variant of the unloading session of FIG. 8.

Referring now to FIGS. 8 and 9, sprayer boom charging system 5 can be used to unload liquid product 23 from the boom 7 or various other components while collecting the unloaded liquid product 23 in product tank 21. Referring now to FIG. 8, at least a portion of the charging line system 85, shown here unloading charge return line 113. To unload charge return line 113, control system 201 (FIG. 2) actuates to closed positions or confirms closed positions of product and rinse tank outlet valves 43, 47, recirculating valves 53, boom delivery valve 57, section feed valves 67. Control system 201 (FIG. 2) actuates to an open position or confirms an open position of charge return valve 115. Then, control system 201 (FIG. 2) commands the air delivery valve 105 to open. Pressurized air from air tank 101 is directed through the air delivery line 103 and air check valve 107. The closed section feed valves 67 prevent the air from flowing into boom 7 and product check valve 61 prevents air from flowing further upstream in the spray product delivery line 55 toward flow meter 59. This forces the air through spray delivery I charge return intersection 111 and into charge return line 113. The flow of pressurized air through charge return line 113 pneumatically forces the liquid product 23 through the charge return line 113 and into product tank 21. Referring now to FIG. 9, to unload boom 7, control system 201 (FIG. 2) actuates to closed positions or confirms closed positions of product and rinse tank outlet valves 43, 47, recirculating valves 53, boom delivery valve 57, drain valves 97, and charge return valve 115. Control system 201 (FIG. 2) actuates to an open position or confirms an open position of section feed valves 67, charge selector valve 83, and charge valves 99. Then, control system 201 (FIG. 2) command the air delivery valve 105 to open. Pressurized air from air tank 101 is directed through the air delivery line 103 and air check valve 107. The closed charge return valve 115 prevents air from flowing into the charge return line 113 and product check valve 61 prevents air from flowing further upstream in the spray product delivery line 55 toward flow meter 59. This forces the air through spray boom main line 63, boom branch lines 65, and the boom sections 27. The pressure of the air can be great enough to great enough to purge liquid product 23 from the boom sections 27 but low enough to not open the spray nozzles 31. This directs the liquid product 23 out of the charge valves 99 in preference to flowing through spray nozzles 31. Correspondingly, the flow of pressurized air through boom sections 27 pneumatically forces the liquid product 23 through the boom sections 27, charge delivery line 87, and into product tank 21.

Many changes and modifications could be made to the invention without departing from the spirit thereof. The scope of these changes will become apparent from the appended claims.

We claim:

1. A sprayer boom charging system for an agricultural sprayer with a spray system that includes a product tank storing liquid product and a wet boom with multiple boom sections, the sprayer boom charging system comprising:
   a spray product delivery line configured to deliver the liquid product towards the multiple boom sections during a spraying session;
   a charge delivery line configured to deliver the liquid product to the multiple boom sections during a boom charging session;
   a charge return line configured to direct air away from the multiple boom sections during the boom charging session;
   wherein each of the multiple boom sections includes:
      an upstream end receiving the liquid product from the product tank via the spray product delivery line during the spraying session;
      an opposite downstream end receiving the liquid product from the product tank via the charge delivery line during the boom charging session;
      multiple nozzles arranged between the upstream and downstream ends that deliver the liquid product from the respective boom section toward an agricultural field; and
      an end valve arranged at the downstream end of the respective boom section to selectively introduce the liquid product from the charge delivery line into the downstream end of the respective boom section during the boom charging session; and
   a control system communicatively coupled to the end valves of the multiple boom sections, the control system being configured to:
      control an operation of the end valve of one of the multiple boom sections to open during the boom charging session to introduce the liquid product from the charge delivery line into the downstream end of the one of the multiple boom sections, with at least a portion of the liquid product introduced from the charge delivery line into the downstream end of the one of the multiple boom sections flowing to the upstream end of the one of the multiple boom sections and from the upstream end into the charge return line during the boom charging session.

2. The sprayer boom charging system of claim 1, wherein:
   a first product flow direction is defined during the spraying session by a flow of the liquid product from the upstream end to the downstream end of each boom section; and
   a second product flow direction is defined during the boom charging session by a flow of the liquid product from the downstream end to the upstream end of each boom section.

3. The sprayer boom charging system of claim 2, wherein the charge return line is connected to the product tank to direct air from the multiple boom sections into the product tank during the boom charging session.

4. The sprayer boom charging system of claim 3, wherein the charge delivery line defines a main charge delivery line and the system further comprises:
   a charge branch line at each of the boom sections that connects the respective boom section to the main charge delivery line.

5. The sprayer boom charging system of claim 4, wherein each charge branch line connects the main charge delivery line to the downstream end of the respective boom section via the end valve.

6. The sprayer boom charging system of claim 1, wherein the charge return line is connected to the product tank to direct air from the multiple boom sections into the product tank during the boom charging session.

7. The sprayer boom charging system of claim 6, wherein the charge return line connects the spray product delivery line to the product tank.

8. The sprayer boom charging system of claim 7, wherein;
   a pump is configured to deliver liquid product from the product tank to the spray product delivery line;
   a spray delivery/charge return intersection is defined in a location of intersection between the spray product delivery line and the charge return line; and at least one valve is arranged in the spray product delivery line between the spray delivery/charge return intersection and the pump to direct a flow from a first segment of the spray product delivery to the charge return line instead of to a remainder of the spray product delivery line.

9. The sprayer boom charging system of claim 8, wherein the at least one valve includes a one-way check valve.

10. The sprayer boom charging system of claim 8, wherein the at least one valve includes an electronically actuated valve.

11. The sprayer boom charging system of claim 8, wherein a flow meter is arranged in the spray product delivery line and the at least one valve includes:
   an electronically actuated valve arranged in the spray product delivery line upstream of the flow meter; and
   a one-way check valve arranged in the spray product delivery line to the downstream of the flow meter and prevent an upstream flow of the liquid product through the flow meter.

12. The sprayer boom charging system of claim 1, wherein the end valve is a charge valve of an end valve assembly arranged at the downstream end of the respective boom section, and wherein the end valve assembly further comprises a drain valve configured to drain liquid product from the respective boom section after the spraying session.

13. The sprayer boom charging system of claim 1, further comprising an electronically actuated valve arranged in the spray product delivery line between the product tank and the multiple boom sections,
   wherein the control system is communicatively coupled to the electronically actuated valve, the control system being further configured to control an operation of the electronically actuated valve to close during the boom charging session.

* * * * *